United States Patent [19]

Smith et al.

[11] 4,418,188

[45] Nov. 29, 1983

[54] POLYETHYLENE ISOPHTHALATE HAVING REDUCED CYCLIC DIMER CONTENT AND PROCESS THEREFORE

[75] Inventors: Richard R. Smith, Cuyahoga Falls; Mellis M. Kelley, Akron, both of Ohio

[73] Assignee: The Goodyear Tire & Rubber Company, Akron, Ohio

[21] Appl. No.: 415,212

[22] Filed: Sep. 7, 1982

[51] Int. Cl.$^3$ .................... C08G 63/04; C08G 63/22; C08G 63/54

[52] U.S. Cl. .................... 528/274; 528/295; 528/295.3; 528/302

[58] Field of Search .................... 528/274, 295, 295.3, 528/302

[56] References Cited

U.S. PATENT DOCUMENTS

| | | | |
|---|---|---|---|
| 4,065,439 | 12/1977 | Ono et al. | 528/302 |
| 4,073,777 | 2/1978 | O'Neill et al. | 528/302 X |
| 4,154,918 | 5/1979 | Buxbaum et al. | 528/302 X |
| 4,254,001 | 3/1981 | Tung | 528/295.3 |
| 4,350,807 | 9/1982 | McConnell et al. | 528/302 |
| 4,383,106 | 5/1983 | Tung | 528/295.3 |

*Primary Examiner*—Lucille M. Phynes
*Attorney, Agent, or Firm*—Bruce J. Hendricks; Alvin T. Rockhill; Daniel J. Hudak

[57] ABSTRACT

This invention relates to polyethylene isophthalate (PEI) and copolymers thereof having low cyclic dimer content and process for making same. The invention provides a process for making PEI using protonic acid catalysts which result in a polymer having lower amounts of ring dimer of ethylene isophthalate than has heretofore been known. Strong protonic acids such as sulfuric or phosphoric are utilized as polymerization catalysts to thereby lower the amount of cyclic dimerization which occurs during the polymerization process. Polymers so produced are of a high purity and have reduced manufacturing costs due both to a smaller amount of material being lost as cyclic dimer and because of lower processing costs associated with cleaning cyclic dimer from the processing equipment.

30 Claims, No Drawings

POLYETHYLENE ISOPHTHALATE HAVING REDUCED CYCLIC DIMER CONTENT AND PROCESS THEREFORE

TECHNICAL FIELD

The present invention relates to polyethylene isophthalate (PEI) and copolymers thereof and a process for making the same. In particular, the invention discloses the use of catalysts which result in polymers having lower cyclic dimer content than has heretofore been possible.

BACKGROUND ART

The synthesis of polyethylene isophthalate (hereinafter referred to as PEI) and copolymers thereof has been accompanied by the formation of large amounts of an undesirable crystalline by-product, commonly referred to as ethylene isophthalate cyclic dimer. This compound creates problems during PEI preparation by subliming during the later stages of polymerization when the molten polymer is subjected to vacuum. Cyclic dimer thereafter deposits on the walls of the reaction vessel and plugs vacuum lines. Processing costs are thereby greatly increased due to the necessity of cleaning the vessel and the vacuum lines. Further, the theoretical polymer yield is reduced by an amount corresponding to the amount of cyclic dimer formed which can be as high as 15% as observed in an article by C. E. Berr, *J. Polymer Science*, 15, 591 (1955). This of course greatly adds to the already considerable raw material costs. Also, the final polymer is contaminated with the high melting cyclic dimer, hence, films or molded articles of PEI contain opaque, white specks of this unmelted by-product. The non-homogeneity of such films and articles severely detracts from their appearance.

Heretofore, polymerizations and copolymerizations involving PEI have been carried out using standard, well-known polycondensation catalysts to increase the rate of polymerization to an acceptable level. Commonly, these catalysts are metallic compounds such as antimony trioxide and various titanium compounds such as alkyl titanates. The present invention utilizes non-metallic, protonic acid catalysts. It has been discovered that the use of non-metallic catalysts yields isophthalate-based homopolymers and copolymers which have reduced cyclic dimer content.

The known art has long recognized the problem of cyclic dimer formation, as for example, C. E. Berr, supra. This article does not, however, teach the use of non-metallic catalysts to reduce cyclic dimer content. U.S. Pat. No. 2,965,613 to Milone, et al, relates to random copolyester of ethylene isophthalate and ethylene terephthalate. While this patent recognizes that cyclic dimerization occurs with polyethylene isophthalate, there is no suggestion of how to reduce the amount of cyclic dimer in the final polymer other than to prepare copolymers containing high amounts of terephthalate units, i.e., greater than about 50% terephthalate.

Reference to the use of acids as polymerization catalysts can be found in *Organic Chemistry of Synthetic High Polymers*, Lenz, R. W., John Wiley, New York, N.Y., 1967, pages 81–91, and *Textbook of Polymer Science*, 2nd ed., Billmeyer, F. W., Wiley-Interscience, New York, N.Y., 1971, pages 264–267. While the authors generally describe the use of acids, they do not disclose the use of protonic acid catalysts to reduce the formation of cyclic dimer in polymerizations involving isophthalate-based polymers.

DISCLOSURE OF INVENTION

It is an aspect of the present invention to provide, as well as a process for making, polyethylene isophthalate and copolymers thereof, having low cyclic dimer content.

It is another aspect of the present invention to provide, as well as a process for making, polyethylene isophthalate, as above, in which the yields per batch are increased due to the decreased formation of cyclic dimer.

It is still another aspect of the present invention to provide, as well as a process for making, polyethylene isophthalate, as above, having excellent clarity.

A still further aspect of the present invention is to provide, as well as a process for making, polyethylene isophthalate in which the physical properties of the polymer can be controlled by the timing of addition of the polymerization catalyst.

Yet another aspect of the present invention is to provide, as well as a process for making, polyethylene isophthalate, as above, which can be used in making containers.

These and other aspects of the present invention which will become more apparent as the detailed description proceeds, are achieved by: a process for making a polyester having low cyclic dimer content, comprising: providing a quantity of one or more dicarboxylic compounds selected from the group consisting of a dicarboxylic acid or alkyl ester thereof having from 4 to 40 carbon atoms and combinations thereof; providing a quantity of one or more glycols selected from the group consisting of ethylene glycol, glycols having from 3 to 12 carbon atoms, glycol ethers having from 4 to 12 carbon atoms, and combinations thereof; providing a protonic acid catalyst; and reacting said dicarboxylic acid and said glycol compounds in the presence of said protonic acid catalyst to form the polyester; wherein at least 50 mole percent of said dicarboxylic quantity is selected from the group consisting of isophthalic acid and alkyl esters thereof having from 10 to 20 carbon atoms; wherein at least 50 mole percent of said glycol quantity is ethylene glycol; and wherein said polyester has an ethylene isophthalate cyclic dimer content of 5 weight percent or less.

In general, a polyester having low cyclic dimer content, comprising: the reaction product of: a quantity of one or more dicarboxylic compounds selected from the group consisting of a dicarboxylic acid or alkyl ester thereof having from 4 to 40 carbon atoms and combinations thereof; a quantity of one or more glycols selected from the group consisting of glycols having from 3 to 12 carbon atoms, glycol ethers having from 4 to 12 carbon atoms, and combinations thereof; and a protonic acid catalyst; wherein at least 50 mole percent of said dicarboxylic quantity is selected from the group consisting of isophthalic acid and alkyl esters thereof having from 10 to 20 carbon atoms; wherein at least 50 mole percent of said glycol quantity is ethylene glycol; and wherein said polyester has an ethylene isophthalate cyclic dimer content of 5 weight percent or less.

BEST MODE FOR CARRYING OUT THE INVENTION

The present invention relates to providing a homopolymer and copolymers of polyethylene isophthalate (PEI) in which cyclic dimerization has been greatly reduced. Cyclic dimer refers to the cyclization of ethylene glycol and isophthalic acid to form the following ring structure:

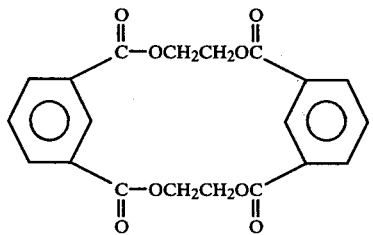

This ring structure contains two units of ethylene isophthalate (hence, the name cyclic dimer) and is a by-product of the polyesterification reaction of ethylene glycol with isophthalic acid or of the transesterification reaction of ethylene glycol with isophthalate esters such as dimethyl- or diethylisophthalate. Esterification or transesterification of a glycol and a dicarboxylic acid or ester thereof is the first step in many conventional processes for making polyesters. The use of selected protonic acids has unexpectedly been found to result in isophthalate polymers and copolymers containing greatly reduced amounts of cyclic dimer by-product. Further, line plugging and material loss has been significantly reduced.

As known to those skilled in the art, polyesters are generally made in two stages. In the first stage, called the esterification or transesterification stage, the dicarboxylic acid or diester is reacted with the glycol at elevated temperatures and at either atmospheric or elevated pressures with water or the corresponding alcohol being removed. In the second or polycondensation stage, a vacuum is gradually applied, generally catalysts are utilized, and additional water along with excess glycol are withdrawn as condensation by-products. Various polyesters can be made by such a polymerization including polyethylene isophthalate and various copolymers thereof. Moreover, the process can be modified slightly by reacting the isophthalic acid with the glycol and a solvent which is a low molecular weight linear polyisophthalate in a manner as set forth in U.S. Pat. No. 4,020,049 to Rinehart, which is hereby fully incorporated by reference with regard to the method of making a polyester resin. Another well known variation utilizes dimethylisophthalate or other diesters which react with ethylene glycol in the presence of a catalyst with a transesterification reaction yielding a bis-hydroxyethoxy isophthalate compound. A stabilizer may then be added as well as a catalyst and a polycondensation reaction is carried out to yield a polyester.

Solid state polymerizations can also be utilized, if crystallizable copolymers having high melting points are made. In this process, a melt polycondensation is carried out as described above until generally the intrinsic viscosity of the polymer reaches about 0.2 or higher, for example, up to about 0.6. At this point, the solution melt is cooled to produce a solid which is then pelletized, chopped, etc. The pellets are then subjected to a solid state polymerization wherein a vacuum is applied at a temperature below the melting point of the partially formed polymer. Thus, the polymer is actually polymerized in a solid state, with the polycondensation reaction being continued in such a state. Generally, the solid state polymerization is continued until the intrinsic viscosity of the polymer reaches any desired level, such as from about 0.60 to about 1.0, or even higher. Desirably, the intrinsic viscosity ranges from about 0.70 to about 0.90. Intrinsic viscosity is measured in deciliters/gram using a 60/40 phenol/tetrachloroethane solution at 25° C. Generally, pure PEI cannot be solid state polymerized due to its amorphous character.

In the prior art, catalysts were often utilized both for the esterification or transesterification and the polycondensation steps. Cyclic dimer has been observed to occur in both steps using conventional metallic catalysts such as compounds of antimony, titanium, manganese, and germanium. The use of protonic acids as catalysts, however, effectively catalyzes the reaction, yet does not result in the formation of large amounts of cyclic dimer. Inorganic acids which have utility as polymerization catalysts include sulfuric, phosphoric, sulfurous, sulfamic acid, i.e., $HNH_2SO_3$, and the like. Organic acids which may be used include trichloroacetic, dichloroacetic, p-toluene sulfonic, and the like. Generally, the amount of acid utilized is dependent upon two variables, namely, the acid's dissociation constant, abbreviated $pK_a$ and its volatility.

In theory, any protonic acid could be used as an esterification or polycondensation catalyst, however, as a practical matter, acids are used having a $pK_a$ of about 2.5 or less and preferably 2.0 or less. Also, acids which do not volatilize to an appreciable extent under the high vacuum and temperature conditions of the second polymerization step described earlier are desired. The reason for this requirement is that a threshold number of catalyst species must be present in the polycondensation step to reduce the amount of cyclic dimer. Thus, for example, acids having $pK_a$ values higher than about 2.5 are required in inconveniently large amounts. Further, highly volatile acids which are lost during the high vacuum and high temperature stage, must be added in initially high concentrations to maintain the threshold amount of acid during this second stage.

In this regard, it should be noted that a highly volatile acid, such as for example HCl, while normally not useful as a polymerization catalyst, may be utilized if loss of the acid is prevented during the polyesterificatin step. For example, the volatile acid may be complexed or encapsulated so that its apparent volatility is reduced. Further, the invention contemplates the use of large amounts of acids having $pK_a$'s above 2.5 if such large amounts do not have a detrimental effect on the polymer in its intended use.

Generally, the amount of acid which is utilized as a catalyst can vary from about 0.001 to about 3 weight percent based on the total weight of the polymer formed. The acids are preferably used in an amount between about 0.01 to about 1.0 weight percent with between about 0.05 and 0.5 being preferred. The actual amount of acid will of course vary depending on its particular $pK_a$ value and its volatility.

In prior art metal catalyzed processes, the amount of cyclic dimer formed from the reaction of ethylene glycol and isophthalic acid or an ester thereof is generally above 5 weight percent and may range up to 15 weight percent. This can be seen by reference to Table II which illustrates the amount of cyclic dimer formed as a function of the particular prior art catalyst used. Use of protonic acid catalysts on the other hand reduces the amount of cyclic dimer to below 5% by weight which is considered the maximum amount of cyclic dimer which can be tolerated in a useful polymer. Desirably, the dimer amount is 4.0 weight percent or less, and preferably 3.0 weight percent or less.

In addition to reducing the cyclic dimer content of polyethylene isophthalate homopolymer, a protonic acid catalyst of the invention may be utilized to the same end with various copolymers thereof. Generally, as the amount of isophthalic compound and/or ethylene glycol decreases as a mole percentage of the total monomer composition, the amount of ethylene isophthalate cyclic dimer also decreases, as would be expected. As seen from the examples given below however, the protonic acid remains effective when used in copolymers to further decrease the amount of cyclic dimer. Moreover, when starting materials other than an isophthalic compound and ethylene glycol are used, undesirable by-products similar in detriment to ethylene isophthalate cyclic dimer may very well be formed, that is, it is highly probable that this dimer is not the only such cyclic oligomer which can be formed as a by-product of a polyesterification reaction. Thus, use of the invention can result in reductions of other cyclic dimers, trimers and other cyclic oligomers which can form when copolymers of polyethylene isophthalate are made, or indeed when a polyester or copolyester is made containing no isophthalic and/or no ethylene glycol.

By definition however, a copolymer of polyethylene isophthalate is a polyester made from monomers wherein the total quantity of dicarboxylic compound comprises at least 50 mole percent isophthalic acid or esters thereof having from 10 to 20 carbon atoms such as dimethylisophthalate and diethylisophthalate and the glycol comprises at least 50 mole percent ethylene glycol or, alternatively, the reaction product in the polycondensation stage comprises at least 50 mole percent ethylene isophthalate.

Various copolymers may thus be made by esterifying other dicarboxylic compounds having from 4 to 40 carbon atoms, and glycols with isophthalic acid or ester and ethylene glycol. The dicarboxylic compound which is not isophthalic acid or an ester thereof can be an alkyl dicarboxylic acid, an aryl dicarboxylic acid, an alkyl substituted nonisophthalic aryl dicarboxylic acid, a dimer acid or an alkali salt of sulfo dialkyl isophthalate. Alkyl dicarboxylic acids desirably contain from 4 to 12 carbon atoms. If the acids are aryl or alkyl substituted aryl acids, they desirably contain from 8 or 9 respectively to about 16 carbon atoms.

Typical examples of linear or alkyl dicarboxylic acids includes glutaric acid, adipic acid, azelaic acid, sebacic acid and the like.

Dimer acids can also be used having from about 34 to 40 carbon atoms and preferably 36 carbon atoms. The dimer is itself prepared from an unsaturated fatty acid containing 18 carbon atoms such as linoleic or linolenic acid or the monohydric alcohol esters thereof. The actual preparation and structure of dimerized $C_{18}$ fatty acids are described in J. A. C.S. 66,84 (1944) and U.S. Pat. No. 2,347,562, both of which are fully incorporated herein by reference. Several different grades of dimer acid are available from commercial sources and these differ from each other primarily in the amount of monobasic and trimer acid fractions and the degree of unsaturation. It is preferred, for purposes of this invention, that the dimer acid be substantially free of the monobasic and trimer acids fractions, that is, less than 8% by weight, and essentially completely saturated, and be added after the transesterification reaction, that is, at the condensation stage. Two different grades of dimer acid, which are useful in preparing the polyesters herein described and meet the above requirements are available from Emery Industries, Inc. under the trade name Empol 1010 dimer acid typically containing 97% dimer acid, 3% trimer acid and essentially no monobasic acids and extremely low unsaturation, and Empol 1014 typically containing 95%, 4%, and 1% of dimer, trimer, and monobasic acids respectively. The dimer acid just described is not to be confused with the cyclic dimer described above.

Typical examples of non-isophthalic aryl acids include terephthalic acid, orthophthalic acid, naphthalic acid, for example, 2,6-naphthalene dicarboxylic acid, and the like. Specific examples of alkyl substituted aryl acids include the various isomers of dimethylphthalic acids such as dimethylorthophthalic acid and dimethylterephthalic acid, the various isomers of diethylphthalic acids such as diethylorthophthalic acid and diethylterephthalic acid, the various isomers of dimethylnaphthalic acid such as 3,7-dimethyl-2,6-naphthalene dicarboxylic acid and 2,5-dimethyl-1,6-naphthalene dicarboxylic acid, and the various isomers of diethylnaphthalene dicarboxylic acid and the like. Generally, terephthalic is preferred.

It is well known to those skilled in the art, in lieu of the various dicarboxylic acids, the various diesters thereof can be utilized. Thus, esters of alkyl dicarboxylic acids containing a total of from 6 to about 20 carbon atoms, esters of aryl dicarboxylic acids having from 10 to 20 carbon atoms as well as esters of alkyl substituted aryl dicarboxylic containing from 11 to about 20 carbon atoms may be utilized such as 3,6-dimethyl-dimethylterephthalate and 3,7-dimethyl-2,6-dimethylnaphthalene dicarboxylate. Examples of alkyl diesters include those made from glutaric acid, adipic acid, azelaic acid, or subacic acid, and the like. Specific examples of various esters of aryl dicarboxylic acids include the various isomers of dimethylphthalate such as dimethylterephthalate, a preferred compound, the various isomers of diethylnaphthalate, and the like.

Another group of dicarboxylic acid compounds are the alkali salts of sulfo dialkylisophthalate where the alkyl group has from 1 to 5 carbon atoms with methyl being highly preferred. Of the alkali compounds, sodium is preferred. Thus, a preferred compound is sodium sulfo dimethylisophthalate. These monomers, if used in sufficient amounts, render the copolymer water soluble.

The amount of the dicarboxylic acid or esters thereof, utilized with the isophthalic acid or ester thereof on a mole basis is generally from about 0, or from about 0.1 to about 50 percent of the total amount of dicarboxylic compound, that is, the total of isophthalic and nonisophthalic acid and/or ester starting material. Generally, where high barrier resistant properties are desired, the amount is from about 0 or 0.1 percent to about 30 mole percent and preferably from about 0 or 0.1 percent to about 20 mole percent.

As noted above, in addition to non-isophthalic diacids or esters thereof, up to about 50 mole percent of glycols other than ethylene glycol and having from 3 to 12 carbon atoms can be utilized. Diols having from 3 to 10 carbon atoms are desired while diols having from 3 to 8 carbon atoms, especially aliphatic or cycloaliphatic diol, are preferred. Examples of glycols include propylene glycols, such as trimethylene glycol, butylene glycols such as tetramethylene glycol, neopentyl glycol, 1,4-cyclohexanedimethanol and the like. The amount of the non-ethylene glycol utilized is desirably 35 mole percent or less of the total molar amount of glycol, and preferably less than 15 mole percent.

Another class of diols include the glycol ethers which contain from 4 to 12 carbon atoms, preferably 4 to 8 carbon atoms, with specific examples including diethylene glycol and 1,4-dihydroxyethoxy benzene.

When forming a copolymer of the present invention, generally all of the various reactants are added and reacted in a conventional manner. For example, all reactants are commonly added at the esterification or the transesterification stage which is followed by a polycondensation stage to produce the polyesters of the present invention. These polyesters are generally random copolyesters. However, block copolyesters can be produced according to the present temperature ($T_g$) of between about 60° and 90° C. Similarly, the use of other diacids or diols other than isophthalic and ethylene glycol respectively, can produce copolymers having a $T_g$ of as low as 35° C.

The effect of the point of addition of the protonic acid catalyst can be seen with reference to Table I. In this Table and in the examples that follow, the polymerization process utilized to generate the data comprises three stages, stage one being the esterification or transesterification step described earlier and stages two and three being different conditions of the polycondensation step. These stages are called S/1, S/2 and S/3 respectively. Fractional stages such as S/2.1, S/2.2, etc., refer to the percentage completion of the stage, that is, S/2.1 means the point at which the S/2 stage is 10% completed S/2.7 is 70% completion of S/2 etc. The S/2 stage is the start of the polycondensation and ends when the pressure in the reaction vessel has been reduced from atmospheric to about 0.5 mmHg and the temperature raised from about 240° C. (initial) to about 270° C. The S/3 stage comprises the final polycondensation wherein a pressure of about 0.5 mmHg is maintained at a temperature of about 270° C. for a period of a couple to several hours.

As seen in Table I which summarizes the results of Examples 1 through 3, the use of sulfuric acid can produce a polyethylene isophthalate homopolymer having low cyclic dimer content and having a form anywhere from that of a flexible leather-like material to that of a brittle resin such as is used in the manufacture of bottles and other containers. The flexible polymer is produced when the sulfuric acid is added early on in the S/2 stage before vacuum has removed excess ethylene glycol (EG). Although the protonic acid can be added at the S/1, S/2 or S/3 stage, the S/2 stage is desired with from about S/2.6 invention by conducting the non-isophthalic compound reaction separated from the isophthalic compound reaction, and reacting the two products together in a conventional manner known to the art to obtain the block copolyesters. As also known to the art, random copolyesters can be obtained even by adding the non-isophthalic compound at nearly the end of the transesterification or esterification stage.

The total amount of diols utilized in comparison to the total amount of acids or esters thereof are conventional. Typically, the mole ratio of the total amount of diol utilized with the total amount of acid is approximately 1.05 to 2.5 and approximately 2.2 when esters are used in lieu of acids. Of course, higher or lower ratios can be used as known to the art. Naturally, if the isophthalic compound is an ester and the copolymer is made, the other monomer is also preferably an ester, that is, a diester of a dicarboxylic acid. When esters are used as a starting material, the polyester is therefore made using any conventional ester route as is well known to the art. If the isophthalic compound is an acid, and a copolymer is made, the other acid monomer is preferably a dicarboxylic acid (other than an isophthalic acid), etc., and the polyester is made according to any conventional nonester route.

The variations in physical properties of polyesters produced by this invention are in large part determined by the use, if any, of the non-isophthalic and/or non-ethylene glycol compounds, the molar ratio of diol to diacid, and by the point of addition of the protonic acid catalyst during the polymerization. For example, while a homopolymer prepared from ethylene glycol and isophthalic acid has a glass transition temperature of approximately 55° C. a copolymer containing non-isophthalic aryl groups such as naphthalic or terephthalic may have a glass transition to about S/2.9 being preferred. Because it is the amount of EG present in the polymerization batch at any given time of addition of the protonic acid catalyst that determines the characteristic resin, the initial ratio of EG/isophthalate is important. Generally, it has been found that the polymerization is best carried out with an initial excess of EG.

It is also contemplated that analogous reactions occur when diols other than EG are used in copolymers and that depending on the particular diacid and diol utilized, copolymers can be produced having a form encompassing a range from highly flexible to brittle resin.

A comparison of the results of Table I with those of Table II show the effect of substitution of protonic acids for standard metallic catalysts. PEI homopolymer utilizing standard metallic catalysts such as those containing titanium, germanium, and the like have cyclic dimer contents ranging from 6 to 7.9%, whereas cyclic dimer contents may be as low as 0.5 weight percent when protonic acids such as sulfuric are utilized.

Table I also lists oxygen permeabilities and intrinsic viscosities for sulfuric acid catalyzed PEI homopolymer. These properties are also affected by the point of addition of the catalyst. Further, gas permeability may be altered through the use of selected diols and diacids in making a copolymer of the invention.

PEI and copolymers thereof are particularly suitable for use as packaging materials, made in the form of a molded container, a film, or the like. They thus find utility as molded containers possessing a clarity heretofore unattainable with PEI and which may be filled with comestibles, food stuffs, as containers which can be blow-molded and used for carbonated beverages, for example, soft drinks, various fruit juices, that is, orange juice, grapefruit juice, etc., as medicine bottles or as film to envelope various items i.e., wrap, such as meat, groceries and the like. A particular use is in the form of containers for various alcohol containing beverages such as beer, wine, liquor and the like and may be blow-molded. These beverages are particularly sensitive to oxygen and the low oxygen permeability of PEI and certain copolymers thereof substantially reduces the amount of oxygen penetration.

Although PEI and its copolymers are largely amorphous, they exhibit properties approaching that of PET when they are oriented in both directions, that is, biaxially oriented. Such orientation is well known to the art and may be achieved by any of several methods, for example, as through blow-molding, commonly used in the formation of bottles and other containers, as well as biaxial orientation currently utilized in the formation of films. In addition to stronger tensile strength imparted to the packaging material by orientation it also imparts a flexibility to the material.

The invention will be better understood by the following Examples which illustrate the preparation of PEI and copolymers using the catalysts described above. In addition, comparative examples are given to illustrate the reductions in cyclic dimer which may be achieved through the use of the protonic acid catalyst.

In the examples and tables which follow, the following definition of terms will apply:

I.V. is intrinsic viscosity measured at 30° C. using a solution of polymer dissolved in a mixture of 3 weight parts of phenol and 2 weight parts of tetrachloroethane;

$T_g$ is the glass transition temperature in °C. of amorphous samples measured with a Differential Scanning Calorimeter; and $PO_2$ is the oxygen permeability measured on an Ox-Tran 100 instrument and reported in cc.mil/100 in$^2$.day.atm.;

Cyclic dimer is the weight percent of ethylene isophthalate cyclic dimer present in the polymer as determined by gel permeation chromatography.

EXAMPLE I

Poly(ethylene isophthalate), PEI, was prepared in the following manner. A small glass reactor tube was charged with 60 grams of isophthalic acid (IPA) and about 50 milliliters of ethylene glycol (EG). This mixture was heated under a nitrogen atmosphere from 180° to about 225° C. over a 3 to 4 hour time period during which water was distilled from the reaction. At the end of the esterification stage, 0.03 grams of concentrated (96%) sulfuric acid (in 3 ml. of EG) was added to the reaction mixture and the temperature raised to 240° C. for about 15 minutes. The pressure in the tube was lowered to about 0.5 mm mercury over a 45 minute time period with ethylene glycol being removed. The temperature was then raised to about 275° C. After about 2 hours at 275° C. and 0.5 mm mercury, a polymer was obtained having an intrinsic viscosity of 0.63 and a very low level (0.5 wt.%) of cyclic dimer by-product. A film of this polymer was quite flexible. Some polymer properties are given in Table I.

EXAMPLES 2 AND 3

Following the procedure of Example I, PEI was prepared by a later addition of the sulfuric acid catalyst to the reactants. In these examples, tough to brittle resins were prepared by addition of the catalyst after removal of most of the excess EG from the reaction mixture. In Example 3, a lower initial EG/IPA molar charge was utilized than in the previous examples. Both polymers contained low levels of cyclic dimer by-product and exhibited excellent oxygen barrier properties. Some polymer properties are shown in Table I.

COMPARATIVE EXAMPLES 4, 5, 6, 7 AND 8

The procedure of Example 1 was generally followed but standard metallic polycondensation catalysts were employed. The low EG/IPA charge ratio of Example 3 was utilized in these examples. Catalysts were generally added after completion of the esterification reaction. In Example 4, $Sb_2O_3$ was added at the start of the esterification reaction. In all of these examples, polymers were obtained which contained relatively high leves of cyclic dimer by-product (6–8 wt. % range). Films of these polymers contained visible opaque particles of the cyclic dimer making them unacceptable as packaging materials. Additionally, large amounts of the cyclic dimer collected in the vacuum lines of the reactor system, reducing polymer yield and requiring frequent cleaning. Some properties of these polymers are shown in Table 2.

EXAMPLE 9

A small glass reactor tube was charged with 70 grams of dimethyl isophthalate (DMI), about 50 grams of ethylene glycol (EG) and 0.025 grams of zinc acetate. This mixture was heated from 180° C. to 225° C. over a 4 hour period during which time methanol was distilled from the reaction mixture. The temperature was then raised to 240° C. and held there for about 45 minutes during which time additional methanol was removed. At this point, 0.027 grams of concentrated sulfuric acid was added. The pressure in the tube was lowered to between about 0.2 and 0.5 mm of mercury and the reactants heated to between about 270° C. and about 280° C. with ethylene glycol being removed. After about 2 hours at the latter temperature, a polymer was obtained which produced a clear, transparent film, essentially free of opaque cyclic dimer by-product. Analysis of this polymer indicated a cyclic dimer content of 2.6 weight percent.

EXAMPLES 10 AND 11

Following the procedure of Example 1, two linear random copolyesters were prepared from a mixture of reactants consisting of 48.0 grams of isophthalic acid, 12.0 grams of terephthalic acid and about 45 milliliters of ethylene glycol. In Example 11, the reaction was catalyzed by antimony trioxide, whereas the reactants in Example 12 were catalyzed by sulfuric acid. Under similar polymerization conditions, the copolymers obtained contained significantly different amounts of ethylene isophthalate cyclic dimer. The copolymer prepared using antimony catalyst contained 3.8% cyclic dimer, whereas the sulfuric acid catalyzed copolymer contained 1.1% cyclic dimer.

EXAMPLE 12

Following the general procedure of Example 1, PEI was prepared using 0.3 grams of p-toluenesulfuric acid as catalyst. The polymer obtained had a high melt viscosity and contained 3.9 weight percent cyclic dimer.

EXAMPLES 13 AND 14

Following the procedure of Example 1, two linear random copolyesters were prepared using sulfuric acid as catalyst. In Example 13, a portion of the ethylene glycol (EG) was replaced with tetramethylene glycol (TMG) to produce a polyisophthalate containing 70 mole percent EG and 30 mole percent TMG. In Example 14, the glycol was EG and a portion of the isophthalic acid (IPA) was replaced with phenylindane dicarboxylic acid (PIDA) to give a copolymer containing 70 mole percent IPA and 30 mole percent PIDA. Both polymerization reactions appeared to be relatively free of cyclic dimer formation. Each copolymer exhibited a relatively high melt viscosity indicating that a high molecular weight had been achieved in these polymerizations.

TABLE I

PROPERTIES OF H$_2$SO$_4$ CATALYZED PEI

| EXAMPLE | H$_2$SO$_4$ ADDITION POINT[a] | INITIAL EG/IPA (molar) | I.V. | CYCLIC DIMER (wt. %) | T$_g$ (°C.) | OXYGEN PERMEABILITY | POLYMER FORM |
|---|---|---|---|---|---|---|---|
| 1 | Start of S/2.1 | 2.5/1 | 0.63 | 0.5 | 23 | 12.2 | Flexible-Leathery |
| 2 | After removal of excess EG (S/2.7) | 2.5/1 | 0.61 | 1.5 | 43 | 5.2 | Tough Resin |
| 3 | After removal of excess EG (S/2.7) | 1.2/1 | 0.45 | 4.0 | 56 | 2–4 | Brittle Resin |

[a]Reaction stages:
S/1 - esterification stage at atmospheric pressure, 180° to 225° C. with H$_2$O removal.
S/2 - start of polycondensation with removal of EG - pressure gradually reduced to about 0.5 mm mercury and temperatures raised from 240° C. to about 280° C.
S/3 - final polycondensation - about 0.5 mm mercury and 280° C.

TABLE II

PROPERTIES OF METAL CATALYZED PEI

| | CATALYST | | | POLYMER PROPERTIES | |
|---|---|---|---|---|---|
| Example | Type | ppm[a] | Added[b] | I.V. | Cyclic Dimer (wt. %) |
| 4 | Sb$_2$O$_3$ | 210 | S/1 | 0.37 | 7.0 |
| 5 | Sb$_2$O$_3$ | 210 | S/2.7 | — | 7.4 |
| 6 | Sodium Germanate | 100 | S/2.7 | 0.81 | 6.0 |
| 7 | Tyzor TBT[c] | 60 | S/2.7 | 0.88 | 6.2 |
| 8 | Tyzor AA[c] | 60 | S/2.7 | — | 7.9 |

[a]parts per million
[b]see note on Table I
[c]TBT = tetra-n-butyl titanate; AA = acetylacetonate titanium chelate While in accordance with the Patent Statutes, the best mode and preferred embodiment have been set forth, it will be apparent to those skilled in the art that various changes and modifications can be made without departing from the spirit or scope of the invention. Accordingly, the invention is measured by the scope of the attached claims.

What is claimed is:

1. A process for making a polyester having low cyclic dimer content, comprising:
   providing a quantity of one or more dicarboxylic compounds selected from the group consisting of a dicarboxylic acid or alkyl ester thereof having from 4 to 40 carbon atoms and combinations thereof;
   providing a quantity of one or more glycols selected from the group consisting of ethylene glycol, glycols having from 3 to 12 carbon atoms, glycol ethers having from 4 to 12 carbon atoms, and combinations thereof;
   providing a protonic acid catalyst; and
   reacting said dicarboxylic acid and said glycol compounds in the presence of said protonic acid catalyst to form the polyester;
   wherein at least 50 mole percent of said dicarboxylic quantity is selected from the group consisting of isophthalic acid and alkyl esters thereof having from 10 to 20 carbon atoms;
   wherein at least 50 mole percent of said glycol quantity is ethylene glycol; and
   wherein said polyester has an ethylene isophthalate cyclic dimer content of 5 weight percent or less.

2. A process according to claim 1, wherein said dicarboxylic quantity includes dicarboxylic compounds selected from the group consisting of alkyl dicarboxylic acids having from 4 to 12 carbon atoms, aryl or alkyl substituted aryl dicarboxylic acids having from 8 or 9 respectively to 16 carbon atoms, dimer acids having from 34 to 40 carbon atoms, alkali salts of sulfo dialkylisophthalate compounds having from 10 to 18 carbon atoms, alkyl diesters of alkyl dicarboxylic acids having from 6 to 20 carbon atoms, and alkyl diesters of aryl or alkyl substituted aryl dicarboxylic acids having from 10 or 11 respectively to 20 carbon atoms; and
   wherein said glycol quantity includes from 0 to 50 mole percent of a non-ethylene glycol selected from the group consisting of glycols having from 3 to 10 carbon atoms and glycol ethers having from 4 to 8 carbon atoms.

3. A process according to claim 2, wherein said isophthalic compound is selected from the group consisting of isophthalic acid, dimethylisophthalate, and diethylisophthalate, and wherein said glycol other than said ethylene glycol is a glycol having from 3 to 8 carbon atoms, and wherein said non-ethylene glycol comprises less than 35 mole percent of said glycol quantity; and
   wherein said dicarboxylic compound other than said isophthalic compound is selected from the group consisting of terephthalic acid, dimethyl terephthalate, diethylterephthalate, dimer acid having 36 carbon atoms 2,6-naphthalene dicarboxylic acid and azelaic acid, the amount of said non-isophthalic compound being 20 mole percent or less.

4. A process according to claim 3, wherein said glycol other than said ethylene glycol is a glycol selected from the group consisting of cyclohexanedimethanol, tetramethylene glycol and propylene glycol, wherein the amount of said glycol is 15 mole percent or less; and
   wherein said non-isophthalic compound is terephthalic acid, dimethyl terephthalate, or diethyl terephthalate.

5. A process according to claim 4, wherein said protonic acid catalyst has a pK$_a$ less than or equal to 2.5.

6. A process according to claim 5, wherein said protonic acid catalyst is present in said reaction in an amount between 0.001 and 3 weight percent of the polymer formed.

7. A process according to claim 6, wherein said protonic acid catalyst is selected from the group consisting of sulfuric, phosphoric, p-toluenesulfonic, sulfurous, sulfamic and trichloroacetic acid.

8. A process according to claim 7, wherein said polymer consists of polyethylene isophthalate and wherein said protonic acid catalyst is sulfuric acid.

9. A process according to claim 8, wherein said sulfuric acid catalyst ranges from 0.01 to 1.0 weight percent of the sum of the diol and carboxylic quantities; and
   including adding said sulfuric acid at from S/2.6 to S/2.9 of the polycondensation stage.

10. A process according to claim 9, wherein said ethylene isophthalate cyclic dimer content is 4% or less.

11. A process according to claims 1, 3, 5, 7, or 10, wherein said polymer is a brittle resin suitable for making a bottle.

12. A process according to claim 11, wherein said diethylene glycol/isophthalate cyclic dimer content is less than 3% by weight.

13. A process according to claims 1, 3, 5, or 12, wherein said polymer is suitable for making a film.

14. A polyester having low cyclic dimer content, comprising:
   the reaction product of:
   a quantity of one or more dicarboxylic compounds selected from the group consisting of a dicarboxylic acid or alkyl ester thereof having from 4 to 40 carbon atoms and combinations thereof;
   a quantity of one or more glycols selected from the group consisting of glycols having from 2 to 12 carbon atoms, glycol ethers having from 4 to 12 carbon atoms, and combinations thereof; and
   a protonic acid catalyst;
   wherein at least 50 mole percent of said dicarboxylic quantity is selected from the group consisting of isophthalic acid and alkyl esters thereof having from 10 to 20 carbon atoms;
   wherein at least 50 mole percent of said glycol quantity is ethylene glycol; and
   wherein said polyester has an ethyleneisophthalate cyclic dimer content of 5 weight percent or less.

15. A polyester according to claim 14, wherein said dicarboxylic quantity includes dicarboxylic compounds selected from the group consisting of alkyl dicarboxylic acids having from 4 to 12 carbon atoms, aryl or alkyl substituted aryl dicarboxylic acids having from 8 or 9 respectively to 16 carbon atoms, dimer acids having from 34 to 40 carbon atoms, alkali salts, sulfo dialkyl isophthalate compounds having from 10 to 18 carbon atoms, alkyl esters of alkyl dicarboxylic acids having from 6 to 20 carbon atoms, and alkyl diesters of aryl or alkyl substituted aryl dicarboxylic acids having from 10 or 11 respectively to 20 carbon atoms; and
   wherein said glycol quantity includes from 0 to 50 mole percent of a non-ethylene glycol selected from the group consisting of glycols having from 3 to 10 carbon atoms and glycol ethers having from 4 to 8 carbon atoms.

16. A polyester according to claim 15, wherein said isophthalic compound is selected from the group consisting of isophthalic acid, dimethylisophthalate, and diethylisophthalate, and wherein said glycol other than said ethylene glycol is a glycol having from 3 to 8 carbon atoms, and wherein said non-ethylene glycol comprises less than 35 mole percent of said glycol quantity; and
   wherein said dicarboxylic compound other than said isophthalic compound is selected from the group consisting of terephthalic acid, dimethyl terephthalate, diethylterephthalate, dimer acid having 36 carbon atoms, 2,6-naphthalene dicarboxylic acid and azelaic acid, the amount of said non-isophthalic compound being 20 mole percent or less.

17. A polyester according to claim 16, wherein said glycol other than said ethylene glycol is a glycol selected from the group consisting of cyclohexanedimethylol, tetramethylene glycol and propylene glycol, wherein the amount of said glycol is 15 mole percent or less; and
   wherein said non-isophthalic compound is terephthalic acid or dimethyl terephthalate.

18. A polyester according to claim 17, wherein said protonic acid catalyst has a $pK_a$ less than or equal to 2.5.

19. A polyester according to claim 18, wherein said protonic acid catalyst is present in said reaction in an amount between 0.001 and 3 weight percent of the polymer formed.

20. A polyester according to claim 19, wherein said protonic acid catalyst is selected from the group consisting of sulfuric, phosphoric, p-toluenesulfonic, sulfurous, sulfamic and trichloroacetic acid.

21. A polyester according to claim 20, wherein said polymer consists of polyethylene isophthalate and wherein said protonic acid catalyst is sulfuric acid.

22. A polyester according to claim 21, wherein said sulfuric acid catalyst ranges from 0.01 to 1.0 weight percent of the sum of the diol and carboxylic quantities; and
   wherein said sulfuric acid is added in the polycondensation stage at stage two.

23. A polyester according to claim 22, wherein said diethylene glycol/isophthalate cyclic dimer content is less than 4%.

24. A polyester according to claims 14, 16, 19 or 23, wherein said polymer is a brittle resin suitable for making a bottle.

25. A polyester according to claim 22, wherein said diethylene glycol/isophthalate cyclic dimer content is less than 3% by weight.

26. A polyester according to claims 14, 16, 18 or 25, wherein said polymer is suitable for making a film.

27. A polyester having low cyclic dimer content, comprising:
   polyethylene isophthalate or a copolyester thereof;
   wherein the polyester has a cyclic dimer content of 5 weight percent or less.

28. A polyester having low cyclic dimer content according to claim 27, wherein said copolymer is made from a dicarboxylic moeity and a glycol moeity, said dicarboxylic moeity having from 4 to 40 carbon atoms and wherein the glycol moeity is selected from the group consisting of glycols having from 2 to 10 carbon atoms; and
   wherein at least 50 mole of said copolymer is polyethylene isophthalate.

29. A polyester having low cyclic dimer content according to claim 28, wherein said cyclic dimer content is 4% or less.

30. A polyester having low cyclic dimer content according to claim 29, wherein said polyester is suitable for making a bottle; and
   wherein said polyester is polyethylene isophthalate.

* * * * *

UNITED STATES PATENT OFFICE
CERTIFICATE OF CORRECTION

PATENT NO. : 4418188
DATED : Nov. 29, 1983
INVENTOR(S) : Richard R. Smith and Mellis M. Kelley It is certified that error appears in the above-identified patent and that said Letters Patent are hereby corrected as shown below:

Delete from column 7, line 18, after "present" to column 8, line 21, after "transition" and substitute therefor the following:

--invention by conducting the non-isophthalic compound reaction separated from the isophthalic compound reaction, and reacting the two products together in a conventional manner known to the art to obtain the block copolyesters. As also known to the art, random copolyesters can be obtained even by adding the non-isophthalic compound at nearly the end of the transesterification or esterification stage.

The total amount of diols utilized in comparison to the total amount of acids or esters thereof are conventional. Typically, the mole ratio of the total amount of diol utilized with the total amount of acid is approximately 1.05 to 2.5 and approximately 2.2 when esters are used in lieu of acids. Of course, higher or lower ratios can be used as known to the art. Naturally, if the isophthalic compound is an ester and the copolymer is made, the other monomer is also preferably an ester, that is, a diester of a dicarboxylic

UNITED STATES PATENT OFFICE
CERTIFICATE OF CORRECTION

PATENT NO. : 4418188
DATED : Nov. 29, 1983
INVENTOR(S) : Richard R. Smith and Mellis M. Kelley It is certified that error appears in the above-identified patent and that said Letters Patent are hereby corrected as shown below:

acid. When esters are used as a starting material, the polyester is therefore made using any conventional ester route as is well known to the art. If the isophthalic compound is an acid, and a copolyester is made, the other acid monomer is preferably a dicarboxylic acid (other than an isophthalic acid), etc., and the polyester is made according to any conventional nonester route.

The variations in physical properties of polyesters produced by this invention are in large part determined by the use, if any, of the non-isophthalic and/or non-ethylene glycol compounds, the molar ratio of diol to diacid, and by the point of addition of the protonic acid catalyst during the polymerization. For example, while a homopolymer prepared from ethylene glycol and isophthalic acid has a glass transition temperature of approximately 55°C a copolymer containing non-isophthalic aryl groups such as naphthalic or terephthalic may have a glass transition temperature ($T_g$) of between about 60° and 90°C. Similarly, the use of other diacids or diols other than isophthalic and

UNITED STATES PATENT OFFICE
CERTIFICATE OF CORRECTION

PATENT NO. : 4418188
DATED : Nov. 29, 1983
INVENTOR(S) : Richard R. Smith and Mellis M. Kelley It is certified that error appears in the above-identified patent and that said Letters Patent are hereby corrected as shown below:

ethylene glycol respectively, can produce copolymers having a $T_g$ of as low as 35°C.

The effect of the point of addition of the protonic acid catalyst can be seen with reference to Table I. In this Table and in the examples that follow, the polymerization process utilized to generate the data comprises three stages, stage one being the esterification or transesterification step described earlier and stages two and three being different conditions of the polycondensation step. These stages are called S/1, S/2 and S/3 respectively. Fractional stages such as S/2.1, S/2.2, etc., refer to the percentage completion of the stage, that is, S/2.1 means the point at which the S/2 stage is 10% completed S/2.7 is 70% completion of S/2 etc. The S/2 stage is the start of the polycondensation and ends when the pressure in the reaction vessel has been reduced from atmospheric to about 0.5 mmHg and the temperature raised from about 240°C (initial) to about 270°C. The S/3 stage comprises the final polycondensation wherein a pressure of about 0.5 mmHg is

UNITED STATES PATENT OFFICE
CERTIFICATE OF CORRECTION

PATENT NO. : 4418188
DATED : Nov. 29, 1983
INVENTOR(S) : Richard R. Smith and Mellis M. Kelley It is certified that error appears in the above-identified patent and that said Letters Patent are hereby corrected as shown below:

maintained at a temperature of about 270°C for a period of a couple to several hours.

As seen in Table I which summarizes the results of Examples 1 through 3, the use of sulfuric acid can produce a polyethylene isophthalate homopolymer having low cyclic dimer content and having a form anywhere from that of a flexible leather-like material to that of a brittle resin such as is used in the manufacture of bottles and other containers. The flexible polymer is produced when the sulfuric acid is added early on in the S/2 stage before vacuum has removed excess ethylene glycol (EG). Although the protonic acid can be added at the S/1, S/2 or S/3 stage, the S/2 stage is desired with from about S/2.6--

Signed and Sealed this

Seventeenth Day of April 1984

[SEAL]

Attest:

GERALD J. MOSSINGHOFF

Attesting Officer

Commissioner of Patents and Trademarks